INVENTOR:
ORVILLE MITCHELL
By Kingsland, Rogers & Ezell
ATTORNEYS

INVENTOR:
ORVILLE MITCHELL,
BY Kingsland, Rogers & Ezell
ATTORNEYS

United States Patent Office 3,093,301
Patented June 11, 1963

3,093,301
LUBRICATING SYSTEM FOR COMPRESSOR
Orville Mitchell, Dallas, Tex., assignor to John E. Mitchell Company, Dallas, Tex., a corporation of Missouri
Filed July 5, 1960, Ser. No. 40,734
4 Claims. (Cl. 230—206)

The present invention relates to a compressor, particularly to a rotary type compressor, and more specifically, it relates to a lubrication system for a rotary compressor.

The lubrication system of the present invention is adapted to be used with rotary compressors of the general type described in the co-pending application of Dwight Tripp Serial Number 846,453, filed October 14, 1959, now abandoned, and assigned to the same assignee as is the present invention.

The compressor is of the rotary type, having pistons arranged radially for reciprocation within a plurality of compression chambers. The shaft for the assembly is stationary, and there is an eccentric contiguous with the shaft for causing the reciprocation of the pistons. An equilateral sleeve, having opposed parallel faces, rotates about the eccentric and causes the pistons to reciprocate as the housing rotates. All of this action of the compressor is described in great detail in the above-mentioned co-pending application.

The compressible fluid is supplied to the compressor through a passage within the shaft. From that passage within the shaft, the fluid is distributed to each compression chamber as its respective piston reaches the beginning of a suction stroke. The return of the compressed fluid is accomplished through the shaft upon the opening of appropriate valve means.

The source of lubricant for lubricating the compressor is contained within a stationary housing connected to the compressor shaft. The lubricant is arranged to be combined with the incoming compressible fluid and to be carried with that compressible fluid through the shaft.

A small orifice through a lower portion of the shaft communicates the lubricant passage with the inner surface of the sleeve. In addition, the sleeve has an orifice through it adjacent each compression chamber. Each such orifice through the sleeve makes communication with the orifice through the shaft one time for each revolution of the compressor. During that communication, the lubricant, being heavier than the compressible fluid, flows into the compression chamber by the force of gravity. At the same time, the lubricant constantly is spread over the friction surfaces between the rotating sleeve and the stationary shaft and eccentric.

Once the lubricant has made communication with the compression chamber, it is caused to be dispersed across all the friction surfaces by the centrifugal force of rotation of the compression chambers. The lubricant then intermingles with the compressible fluid within the compression chamber and it is exhausted with that compressible fluid. Both the compressible fluid and the lubricant flow through the return passage within the shaft from which they are discharged within the housing containing the lubricant source. Because the lubricant is heavier than the compressed fluid, it falls to the lower portion of the lubricant container into a lubricant pool, while the compressed fluid gathers within the upper portion of the container. The exit port for the compressed fluid being located high within the lubricant container, only the compressed fluid passes out of the container, the lubricant remaining within the pool at the bottom of the container.

An object of the invention is to provide a system for lubricating a rotary piston system, such as a compressor, which assures the distribution of lubricant over the critical friction surfaces within the compression chambers.

Another object of the invention is to provide a lubrication system for a rotary piston system which employs the centrifugal force of rotation of the piston system as a means for assuring the distribution of the lubricant over the friction parts.

Another object of the invention is to provide a lubrication system for a piston and housing assembly, of the type adapted to act upon a fluid, which employs a means for combining the lubricant with the incoming fluid, separating the two so that each can perform its own function, and thereafter combining the fluid and the lubricant within the compression chambers for exhaust from the piston and housing assembly.

Another object of the invention is to provide a lubricating system for a piston assembly which includes means for recycling the lubricant through the assembly.

Still another object of the invention is to provide a lubrication system for a rotary piston assembly which provides metering and filtering means for controlling the lubricant flow from a high pressure refrigerant source to a low pressure refrigerant chamber, thence along substantially controlled paths with the refrigerant through the piston assembly and back to the refrigerant source.

Other objects and advantages will be apparent to those skilled in the art.

Figure 1:
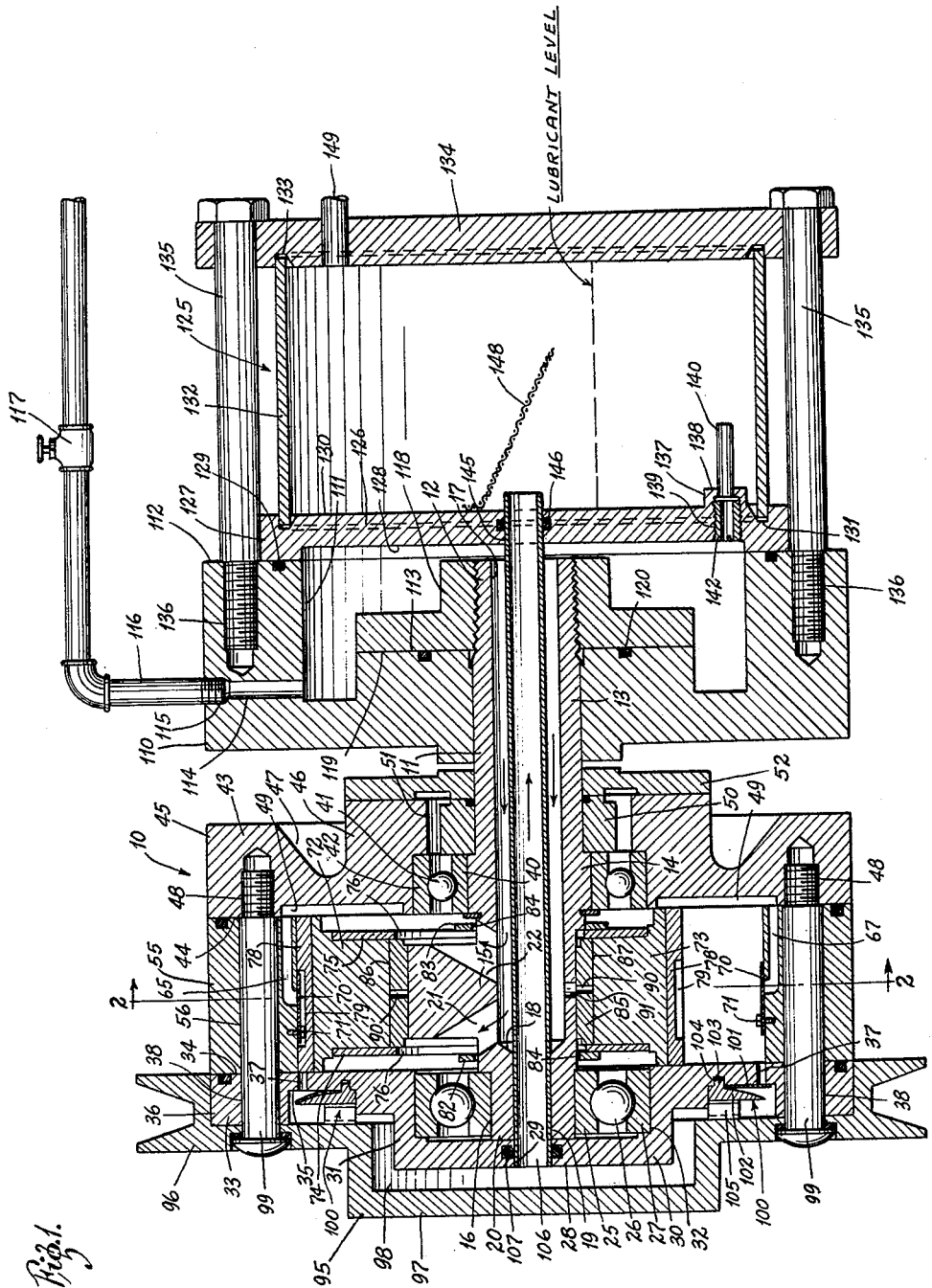
FIGURE 1 is a front-to-rear section view of the compressor and lubricant system taken through an axis of the system.

The present lubrication system is shown in a preferred embodiment, and this embodiment comprises a rotary compressor having pistons arranged radially for reciprocation within a plurality of compression chambers. This compressor is similar in structure and operation to the compressor of the co-pending application assigned to the same assignee as is the present invention, which co-pending application has already been referred to. The general structure and essentials of operation of this compressor will be described following, but it should be recognized that there are other possible uses for the principle of the present lubrication system.

The description of the invention will begin with the compressor, designated generally by the numeral 10. The compressor 10 includes an irregularly-shaped hollow shaft 11. The shaft 11 is threaded at its rearward end 12 for engagement with various parts to appear. A section 13 of the shaft 11, of uniform diameter, extends forwardly of the threaded end 12, and terminates at a section 14 of increased diameter, which section 14 forms an annular bearing seat about the shaft 11.

Spaced from the bearing seat 14 is an annular eccentric 15. The eccentric 15 is cylindrical in shape with a diameter considerably greater than that of the shaft 11, the diameter of the eccentric 15 being determined by the length of stroke desired in the piston in a manner which will hereafter become evident.

There is another bearing seat 16 at the forward end of the shaft 11, and the bearing seat 16 is spaced from the eccentric 15 approximately the same distance as the space between the eccentric 15 and the bearing seat 14. The bearing seat 16 differs from the bearing seat 14 in that the diameter of the bearing seat 16 is somewhat less than the diameter of the shaft 11.

The shaft 11 defines certain communicating passages, and for this purpose, there is an elongated bore 17 extending from the rear end 12 of the shaft and terminating at a forward end 18 approximately even with the forward end of the eccentric 15. A counterbore 19 of smaller diameter than the bore 17 extends from the forward end 18 of the bore 17 through the front end 20 of the shaft 11.

The eccentric 15 includes two passages or channels 21 and 22 which communicate with the bore 17 and open through the forward and rearward surfaces, respectively, of the eccentric 15.

Seated upon the forward bearing seat 16 is the inner race 25 of a rotary ball bearing assembly 26. There is an outer race 27 for the ball bearing assembly 26.

A portion of the housing is made up of a front plate 28. The front plate 28 has a hole 29 through the center of it of the same diameter as the bore 19. The hole 29 opens through a generally vertical and circular forwardmost portion 30 of the front plate 28. There is an annular portion 31 contiguous with the forwardmost portion 30, and the inner surface 32 of the annular portion 31 defines a bearing seat which makes contact with the outer race 27 of the ball bearing assembly 26. The front plate 28 is further formed with a flange portion 33 having a rear surface 34 located slightly behind the ball bearing assembly 26.

There is an annular recess portion 35 intermediate the radial span of the flange portion 33, and outwardly from the recessed portion 35, the rim 36 of the flange portion 33 is deeper than the rest of that flange portion. There are a plurality of orifices 37 through the flange portion 33, adjacent the recess 35, one communicating with each compression chamber, of which there are four illustrated as will be described. The rim portion 36 has a plurality of bores 38 to permit the securement of the front plate 28 to the rest of the housing.

Pressed to the bearing seat 14 is the inner race 40 of another ball bearing assembly 41. The ball bearing assembly 41 has an outer race 42.

A rear plate 43 is seated about the outer race 42 of the ball bearing assembly 41. The rear plate 43 has a forward face 44; there is an outer rim portion 45, and an inner hub portion 46, thicker than the rim portion 45 and separated from the rim portion 45 by a weight-saving annular recess 47.

The rear plate 43 has a plurality of tapped recesses 48, each coaxial with a corresponding hole 38 through the front plate 33. The rear plate 43 also has a plurality of grooves 49 formed in the forward face 44 of the plate, there being a groove 49 adjacent each compression chamber to form part of the fluid passage as will be explained.

A rotary seal 50 surrounds the portion 13 of the shaft 11, and bears against the inner race 40 of the ball bearing assembly 41. The seal 50 is spaced from the rear plate 43 so that between the two there is an annular recess 51 communicating with the space between the inner race 40 and the outer race 42 of the ball bearing assembly 41.

A cover plate 52 is attached to the rear plate 43 by conventional means, such as welding, and provides a closure for the recess 51. The cover plate 52 slides against the seal 50.

Between the front plate 33 and the rear plate 43 is the compression block 55. The compression block 55 has a plurality of holes 56 through it corresponding to, and coaxial with, the holes 38 in the front plate 33.

Figure 2:
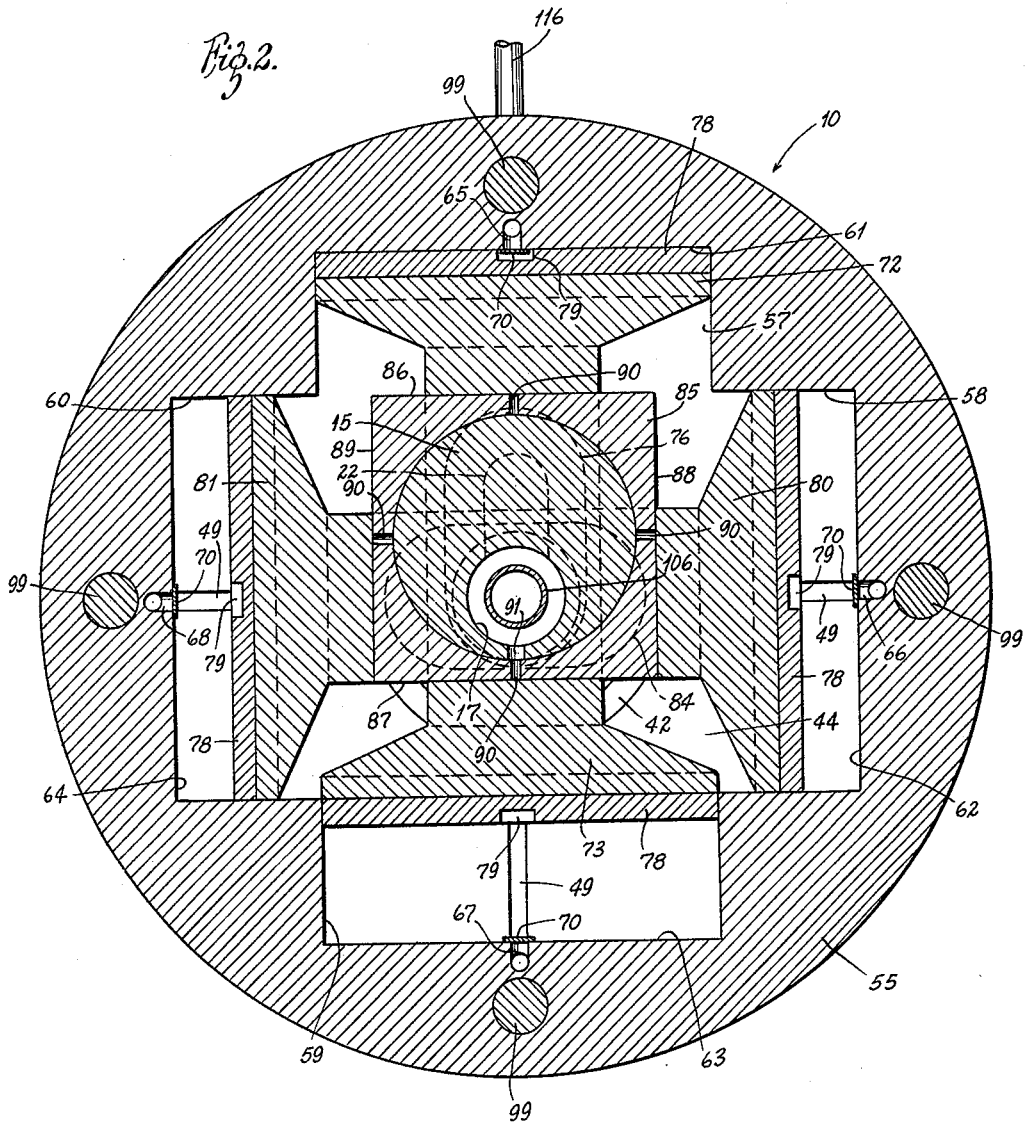
FIGURE 2 is an enlarged view in section taken along the lines 2—2 of FIGURE 1.

The compression chambers are formed in the compression block 55 and appear in FIGURE 2 as a cross with four branches 57, 58, 59 and 60. The surfaces of the compression chambers 57, 58, 59 and 60 are planar. Opening through the outer surfaces 61, 62, 63 and 64 of the compression chambers 57, 58, 59 and 60, respectively, are a plurality of fluid passages 65, 66, 67 and 68, respectively, and each of these fluid passages communicate with a groove 49.

A sheet metal valve element 70, held to the outer faces of each compression chamber by bolts 71, provides opening and closing of the passages 65, 66, 67 and 68. The valves 70 open and close according to the fluid forces against them. Upon a suction stroke of a piston, the pressure of the fluid in a passage 65, 66, 67 or 68 will cause the valve to open while a compression stroke of the piston will hold the valve closed.

A pair of pistons 72 and 73, having the shape clearly illustrated in FIGURES 1 and 2, are connected together by connecting plates 74 and 75. The connecting plates 74 and 75 have elongated slots 76 for receiving the shaft 11 during reciprocation of the pistons. There is a piston head plate 78 secured to the pistons 72 and 73, and the plate 78 has appropriate recesses 79 for preventing interference of the piston head plate 78 with the sheet metal valve 70.

A similar pair of pistons 80 and 81 are arranged to reciprocate within the compression chambers 58 and 60, respectively; the pistons 80 and 81 are connected together by plates 82 and 83 which have elongated slots 84 for receiving the shaft 11.

The pistons are caused to reciprocate by the rotation of a sleeve 85 about the eccentric 15.

The sleeve 85 has opposite pairs of faces 86, 87, 88 and 89 which space the opposed pairs of pistons 72 and 73, and 80 and 81, respectively. The bases of the pistons rest against these surfaces of the sleeve 85. As the sleeve 85 rotates about the eccentric 15, each of the faces 86 through 89 varies in distance from the center of the shaft 11. It is this variation which causes the pistons to reciprocate.

Through each face 86 through 89 of the sleeve there is a small port or orifice 90. The ports 90 communicate their respective faces with the inner surface of the sleeve 85.

As the ports 90 of the sleeve 85 rotate with that sleeve, each of those ports comes into communication, once per revolution, with a port 91 through the bottom of the shaft 11. The port 91 may be made with a somewhat larger diameter than that of the port 90. The port 91 thus communicates the interior of the shaft 11, defined by the passage 17, with the ports 90 as they pass the port 91, and therefore with the interior of each compression chamber once for each revolution of the housing.

There is a pulley plate or cover plate 95 adapted both to cover the front of the compressor housing as well as to provide a pulley by which the housing can be driven. The pulley plate 95 has the shape clearly illustrated in FIGURE 1, and includes generally a flat annular portion 96 surrounding a squared cup-like portion 97. A space 98 is thus defined between the pulley plate 95 and the front plate 33. A plurality of bolts 99 pass through the pulley plate 95 and the holes 38 and 56 of the front plate and compression block, respectively. These bolts 99 are threaded into the tapped holes 48 of the rear plate 43 and serve to hold the piston housing together.

Wedged between the pulley plate 95 and the front plate 33, within the recess 35 and adjacent each port 37, is a valve plate assembly 100. Each assembly 100 includes a flexible plate 101 held in position by a limiting block 102. The limiting block is positional by a nub 103 in a recess 104 and held there by an appropriate wedge 105 pressed against the block 102 by the pulley plate 95. The flexible valves 101 move between a closed position across the ports 37 and an open position against the blocks 102.

A tube 106 is wedged into recess 19 as well as the hole 29 of the front plate 33, and there is an O ring seal 107 between the tube 106 and the front plate 33. The tube 106 communicates the space 98 with a lubricant source to be described. The tube is fluid-tight and defines a passage through the shaft 11 in addition to the passage defined by the bore 17.

Rearward of the compressor 10, a generally cylindrical block 110 is mounted upon the portion 13 of the shaft 11. There is an annular recess 111 in the rearward face 112 of the block 110, and centrally of the recess 111, the face 113 of the block 110 is located forward of the face 112.

There is a passage 114 through the top of the block 110, and the passage 114 has a countersunk and tapped portion 115 into which a fluid pipe 116 is threaded. There is a cut-off valve 117 in the pipe 116.

A locking plate 118 is threaded onto the end 12 of the shaft 11. The plate 118 has a face 119 which rests against the face 113 of the block 110. An O ring 120 provides a seal between the faces 113 and 119.

Finally, a lubricant container 125 is mounted to the face 112 of the block 110. The container 125 includes a forward plate 126 which has a thickened outer rim 127. Thus, an inner forward face 128 of the plate 126 is spaced from the plate 118. There is an O ring seal 129 between the face 112 and the plate 126.

About the rearward face 130 of the plate 126 is an annular groove 131 for receiving the circular edge of a cylinder 132. The opposite edge of the cylinder 132 is received within a similar groove 133 cut into a rear plate 134.

A plurality of bolts 135 threaded into appropriate tapped holes 136 in the block 110 secure the entire lubricant housing 125 to the block 110 when the bolts 135 are tightened. In that event, the cylinder 132 becomes tightly wedged between the grooves 131 and 133.

The forward plate 126 of the lubricant container 125 has an internally threaded boss 137 through it. An inwardly directed annular flange 138 terminates the rearward end of the internal threads 139.

A sintered bronze filter 140 has a flange 141 that is seated against the flange 138 so that the filter 140 projects into the container 125. A sleeve 142 is threaded into the boss 137 to retain the filter 140.

The area and density of the sintered bronze filter 140 are chosen to produce the proper flow rate of lubricant. Therefore, the filter 140 may also be regarded as a flow meter.

In addition to the area and density of the filter 140, the rate of flow of the lubricant is influenced by the difference in pressure between the ingress and egress of refrigerant to and from the compressor. The ingress pressure, of course, is the pressure in the outer pipe 116. This pressure may be thought of as a suction pressure inasmuch as it has a lower value (about 30 p.s.i.) than the egress pressure. The egress pressure is the refrigerant pressure within the lubricant container 125 (about 250 p.s.i.) that exerts a force upon the surface of the lubricant within that container. This pressure tends to force the lubricant through the filter 140.

There is another hole 145 through the plate 126. The channel 106 passes through the hole 145, and a seal 146 is provided between the two.

The fluid that emerges through the channel 106 is mixed with lubricant, but a screen 148 attached at an angle to the forward plate 126 intercepts the lubricant and causes it to drip off into the pool at the lower part of the container 125.

A port 149 near the top of the container 125 delivers the refrigerant fluid to the refrigerating system (not shown).

*Operation*

In the operation of the present compressor, the shaft 11 and the eccentric 15, as well as the block 50, are stationary. (The lubricant housing 125 and the compressible fluid source which are secured to the shaft 11 are also stationary.) When a driving force is applied, as for example by a belt surrounding the belt pulley 95, the compressor housing is caused to rotate. As the housing rotates, it carries with it the compression chambers and their respective pistons. The flat based pistons cause the sleeve 85 to rotate with the housing.

As the sleeve rotates with the housing, the position of the eccentric 15 relative to the shaft 11 causes the pistons to reciprocate within their respective compression chambers.

As was explained in detail in the previously-mentioned co-pending application, the present compressor is balanced in all phases of its operation. That is to say, the center of mass of the piston system remains at one point during rotation of the system.

The low-pressure refrigerant flows through the pipe 116 as controlled by the valve 117. It fills the chamber defined by the walls 111 and 128 with the block 118, and then passes into the channel 17 through the shaft 11. From the channel 17, the fluid can pass through the passages 21 and 22 in the eccentric 15 to the passage 49, and then to the passage 65 where it can enter the compression chambers, depending upon the position of the valve 70.

When the pistons are moving away from the valve 70, the partial vacuum created with the compression chamber cooperates with the pressure of the incoming fluid to cause the sheet metal valve 70 to open admitting fluid to the compression chamber. Upon a compression stroke, the pressure within the compression chamber causes the valve 70 to close and the valve 101 to open. The compressed high pressure fluid then passes through the passage 98, the tube 106, and into the center of the lubricant container 125. From there it passes out of the lubricant container 125 through the pipe 149 near the top of the lubricant container 125 to be cycled through the refrigeration system and thereafter returned to the compressor through the pipe 116.

The lubricant is contained within a bath at the lower section of the container 125. Because the lubricant is heavier than the refrigerant gas, the two are separated within the container 125 and this separation is aided by the wire screen 148.

It is important that the lubricant container 125 be adjacent the compressor in order that some of the heat of compression be retained in the refrigerant gas, and condensation of refrigerant within the lubricant container avoided thereby.

The lubricant enters the stream of refrigerant flow through the metering means 140 because of the pressure difference between the uncompressed fluid in the passage 17 and the compressed fluid above the lubricant pool. The lubricant is carried with the refrigerant through the passage 17, but when it reaches the area of the passage 17 adjacent the eccentric 15, most of the lubricant tends to drop through the port 91 because of its heavier nature. A small part of the lubricant is carried with the refrigerant through the passages 21 and 22 and on through the passage 65 into the compression chamber as has been described.

The lubricant which passes through the port 91 spreads over the surfaces between the sleeve 85 and the eccentric 15. In addition, each time a port 90 in the sleeve passes the port 91, lubricant drops through the port 90 and lubricates the surfaces between the sleeve 85 and the piston adjacent that port 90.

Lubricant which has passed through the port 90 is flung by the centrifugal force of rotation of the housing in an outward direction. It splashes against the side walls of the compression chambers to lubricate the surfaces between the pistons and compression chambers. The centrifugal force of rotation causes the lubricant to be carried into the compression chambers where it mixes with the compressed fluid, and the lubricant is thereafter carried out past the valves 101 with the compresed fluid.

The lubricant is carried with the compressed fluid through the passage 98 and the tube 106 into the lubricant container 125. Once the mixture reaches the container 125, the lubricant clings to the screen 148 and drips down to the bottom portion of the container 125, and the refrigerant is carried out through the pipe 149 for use by the refrigeration cycle.

A distinct advantage in the present compressor is the elimination of the necessity for periodic bleeding of the refrigerant into the compressor during these periods when the compressor is normally shut off, as during cold weather intervals. This bleeding has been necessary for conventional compressors because the lubricant is intermixed with the refrigerant fluid, rather than being separated into a separate bath as with the present compressor. Accordingly, periodic lubrication required the circulation of both lubricant and refrigerant through the compressor. Since, in the instant compressor, the lubricant is separate from the refrigerant, no bleeding of the refrigerant is necessary.

Various changes and modifications may be made within the process of this invention as will be readily apparent to those skilled in the art. Such changes and modifications are within the scope and teaching of this invention as defined by the claims appended hereto.

What is claimed is:

1. In a compressor having a stationary hollow shaft, a housing rotatable about the shaft, a plurality of compression chambers within the housing, means to deliver a compressible fluid to the chambers, a plurality of pistons within the chambers, means to cause the pistons to reciprocate as the housing rotates, a lubrication system comprising an oil reservoir, an oil passage leading from the oil reservoir to the interior of the shaft, an orifice through the shaft in communication with the lower side of the interior of the shaft and in the plane of rotation of the chambers, means for communicating the inner side of each chamber with the orifice as each chamber rotates past the orifice, a fluid outlet port adjacent the outer side of each chamber for receiving both lubricant and compressible fluid following compression, passage means communicating the fluid outlet ports with the oil reservoir, and means for separating the oil from the compressed fluid delivered by the last-mentioned passage means to the reservoir.

2. The combination of claim 1 wherein the last-mentioned passage means extends through the stationary shaft and includes individual connections to the fluid outlet ports with one-way valves to prevent fluid from flowing into the chambers through the outlet ports.

3. The compressor of claim 1 wherein the oil reservoir is adjacent the compression chambers, close enough to utilize the heat of compression for preventing condensation and precipitation of refrigerant into the lower part of the reservoir.

4. In a compressor having a shaft, a housing having a plurality of compression chambers and being rotatable about the shaft, and a plurality of pistons reciprocable within the compression chambers; eccentrically mounted block means between the shaft and the pistons for causing the pistons to reciprocate within their respective compression chambers as the housing rotates about the shaft, a passage through the shaft for conveying a compressible fluid to the compression chambers; a source of compressible fluid connected to said passage; means for causing lubricant to be carried with the fluid to the compression chambers, separate access means for the lubricant by which it is transmittable to the friction surfaces between each piston and its compression chamber, the separate access means including a plurality of orifices through the block means, one orifice communicating each compression chamber with the passage, the separate access means being positioned at a low point of the passage to incorporate the fact of a density difference between the fluid and the lubricant as part of the force for separating the lubricant from the fluid and conveying the lubricant through the access means to the friction surfaces.

References Cited in the file of this patent

UNITED STATES PATENTS

| | | |
|---|---|---|
| 941,646 | Olsen et al. | Nov. 30, 1909 |
| 1,731,774 | Gurley | Oct. 15, 1929 |
| 1,752,093 | King | Mar. 25, 1930 |
| 2,035,276 | Replogle | Mar. 24, 1936 |
| 2,522,638 | Ricardo et al. | Sept. 19, 1950 |
| 2,562,954 | Schmidlin | Aug. 7, 1951 |
| 2,618,430 | Smith | Nov. 18, 1952 |
| 2,827,227 | Schmidlin et al. | Mar. 18, 1958 |
| 2,990,111 | Bohn | June 27, 1961 |

FOREIGN PATENTS

| | | |
|---|---|---|
| 686,951 | Great Britain | Feb. 4, 1953 |